(12) United States Patent
Eckhart (10) Patent No.: US 9,586,368 B1
(45) Date of Patent: Mar. 7, 2017

(54) METHOD OF MANUFACTURING A COATED ANIMAL FEEDER

(71) Applicant: Michael Eckhart, Maquoketa, IA (US)

(72) Inventor: Michael Eckhart, Maquoketa, IA (US)

(*) Notice: Subject to any disclaimer, the term of this patent is extended or adjusted under 35 U.S.C. 154(b) by 168 days.

(21) Appl. No.: 14/201,424

(22) Filed: Mar. 7, 2014

Related U.S. Application Data (60) Provisional application No. 61/774,354, filed on Mar. 7, 2013.

(51) Int. Cl.
| | |
|---|---|
| *B29C 70/68* | (2006.01) |
| *A01K 5/01* | (2006.01) |
| *B29C 41/20* | (2006.01) |
| *B29C 45/14* | (2006.01) |
| *B29C 39/10* | (2006.01) |

(52) U.S. Cl.
CPC .............. *B29C 70/682* (2013.01); *A01K 5/01* (2013.01); *B29C 39/10* (2013.01); *B29C 41/20* (2013.01); *B29C 45/14065* (2013.01); *B29C 70/683* (2013.01); *B29C 70/688* (2013.01); *B29C 2045/14131* (2013.01)

(58) Field of Classification Search
CPC ....... B29C 33/123; B29C 39/10; B29C 41/20; B29C 45/14065; B29C 45/14131; B29C 70/68; B29C 70/682; B29C 70/688; B29C 70/70; B29C 70/683
USPC ......................................... 264/274, 275, 279
See application file for complete search history.

(56) References Cited

U.S. PATENT DOCUMENTS

| | | | | | |
|---|---|---|---|---|---|
| 1,338,484 | A | * | 4/1920 | Baker ..................... | E04H 7/26 264/32 |
| 2,326,010 | A | * | 8/1943 | Crom ....................... | E04H 7/18 138/175 |
| 2,816,323 | A | * | 12/1957 | Munger ............... | B28B 19/0038 138/146 |
| 3,263,007 | A | * | 7/1966 | Martin ..................... | B28B 1/26 264/279 |
| 4,153,103 | A | * | 5/1979 | Bachli .................... | B65D 90/06 165/47 |
| 4,241,126 | A | * | 12/1980 | Nicolas ............... | B28B 19/0053 156/242 |
| 5,168,682 | A | * | 12/1992 | Rye ......................... | E03F 3/04 264/274 |
| 5,431,295 | A | * | 7/1995 | Meess ...................... | G21F 9/34 220/62.15 |
| 6,315,077 | B1 | * | 11/2001 | Peacock ................. | E04G 15/061 182/90 |
| 2010/0072347 | A1 | * | 3/2010 | Wolf ........................ | E04H 7/26 249/27 |
| 2010/0251649 | A1 | * | 10/2010 | Woolbright ............. | E02D 17/20 52/309.17 |
| 2013/0145710 | A1 | * | 6/2013 | Zhou ..................... | B28B 19/00 52/415 |

* cited by examiner

*Primary Examiner* — Michael Safavi
(74) *Attorney, Agent, or Firm* — Hamilton IP Law, PC; Jay R. Hamilton; Charles A. Damschen (57) ABSTRACT

In one illustrative embodiment of a coated feeder, a coating is integrated into the structural components of the feeder. The coated feeder may include a base, ridge, and back, which may all be integrally formed with one another. The coating may include an exterior surface opposite concrete. The surface of the coating adjacent the concrete may include at least one tab, at least one linear protrusion, at least one hook, and at least one channel.

4 Claims, 8 Drawing Sheets

METHOD OF MANUFACTURING A COATED ANIMAL FEEDER

CROSS REFERENCE TO RELATED APPLICATIONS

This application claims priority from provisional U.S. Pat. App. No. 61/774,354 filed on Mar. 7, 2013, which is incorporated by reference herein in its entirety.

FIELD OF INVENTION

The present invention relates to a feeder and uses thereof, and more specifically, to a feeder configured for use with animal food.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Listing of Elements

| ELEMENT DESCRIPTION | ELEMENT # |
|---|---|
| Coated feeder | 10 |
| Feeder | 12 |
| Mold | 14 |
| Base | 20 |
| Base/ridge interface | 22 |
| Base/back interface | 24 |
| Ridge | 30 |
| Back | 40 |
| Coating | 50 |
| Exterior surface | 51 |
| Tab | 52 |
| Linear protrusion | 54 |
| Hook | 56 |
| Channel | 58 |
| Concrete | 60 |
| Aggregate | 62 |
| Cement | 64 |
| Reinforcement structure | 70 |
| Coating engager | 72 |

DETAILED DESCRIPTION OF AN ILLUSTRATIVE EMBODIMENT

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1:
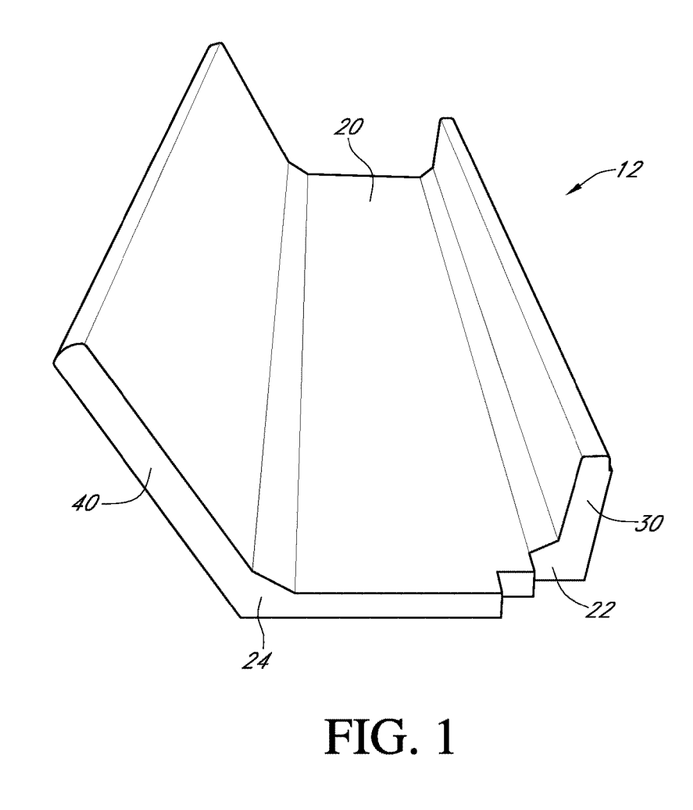
FIG. 1 provides a side view of an illustrative embodiment of a feeder without a coating.
Figure 2:
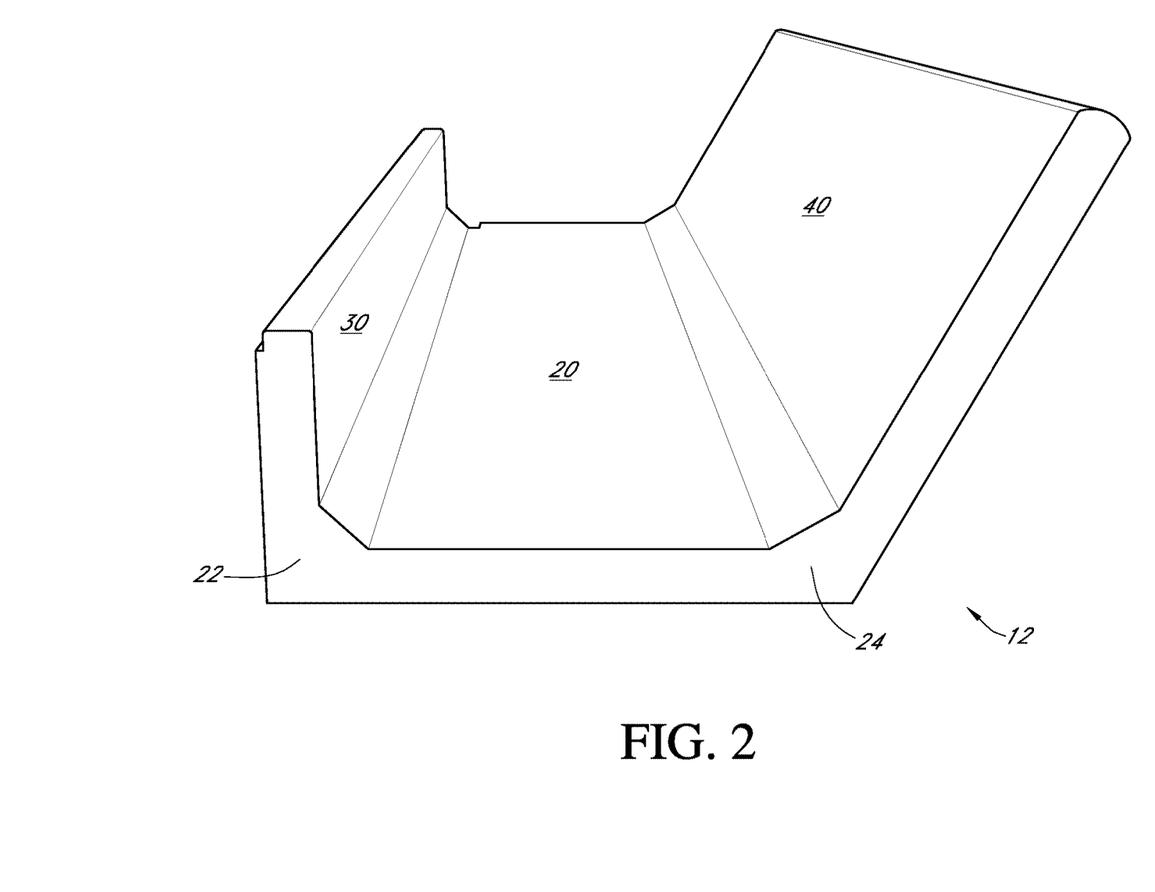
FIG. 2 provides a second side view of the embodiment of a feeder shown in FIG. 1.
Figure 3:
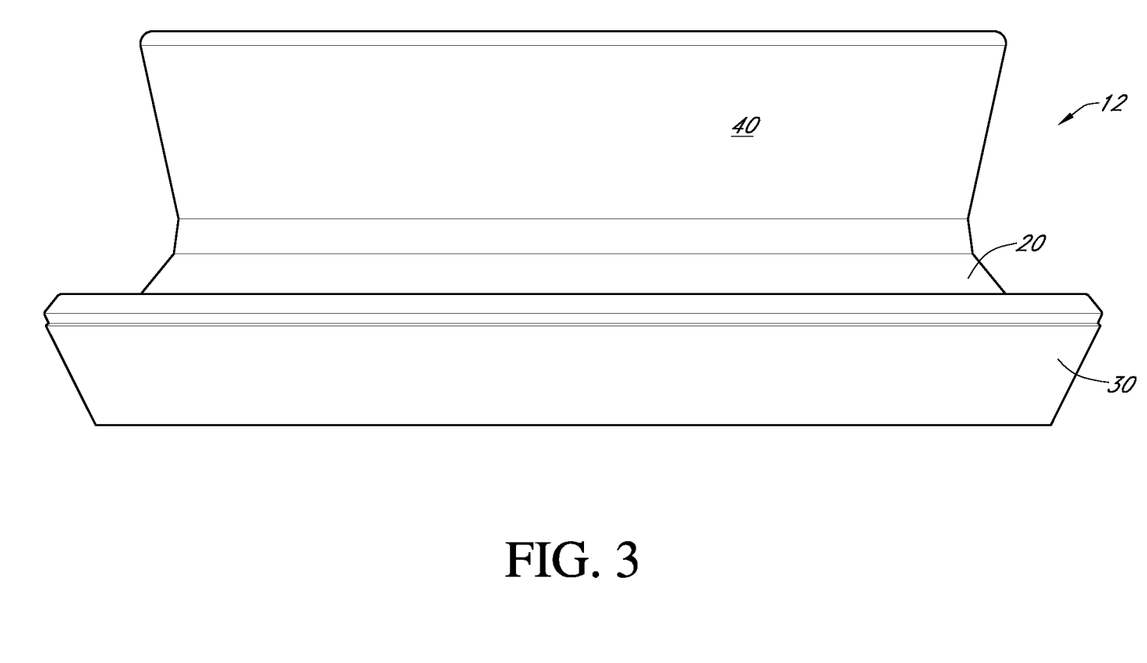
FIG. 3 provides a front view of the embodiment of a feeder shown in FIGS. 1 & 2.

Referring now to the drawings, wherein like reference numerals designate identical or corresponding parts throughout the several views, FIGS. 1-3 provide side perspective and front views, respectively, of a feeder 12. This type of feeder 12 is often used with animals, but the scope of the present disclosure is not so limited. The feeder 12 may include a base 20 to which a ridge 30 and back 40 may be engaged. The ridge 30 may be engaged with the base 20 through a base/ridge interface 22 and the back 40 may be engaged with the base 20 through a base/back interface 24 as best shown in FIGS. 1 & 2. The base/ridge interface 22 and/or base/back interface 24 may contain additional material so as to increase the structural integrity of the feeder 12 and prevent breaking thereof. It is contemplated that the feeder 12 shown in FIGS. 1-3 may be made of concrete or cement, although other suitable materials may be used without limitation.

Figure 4:
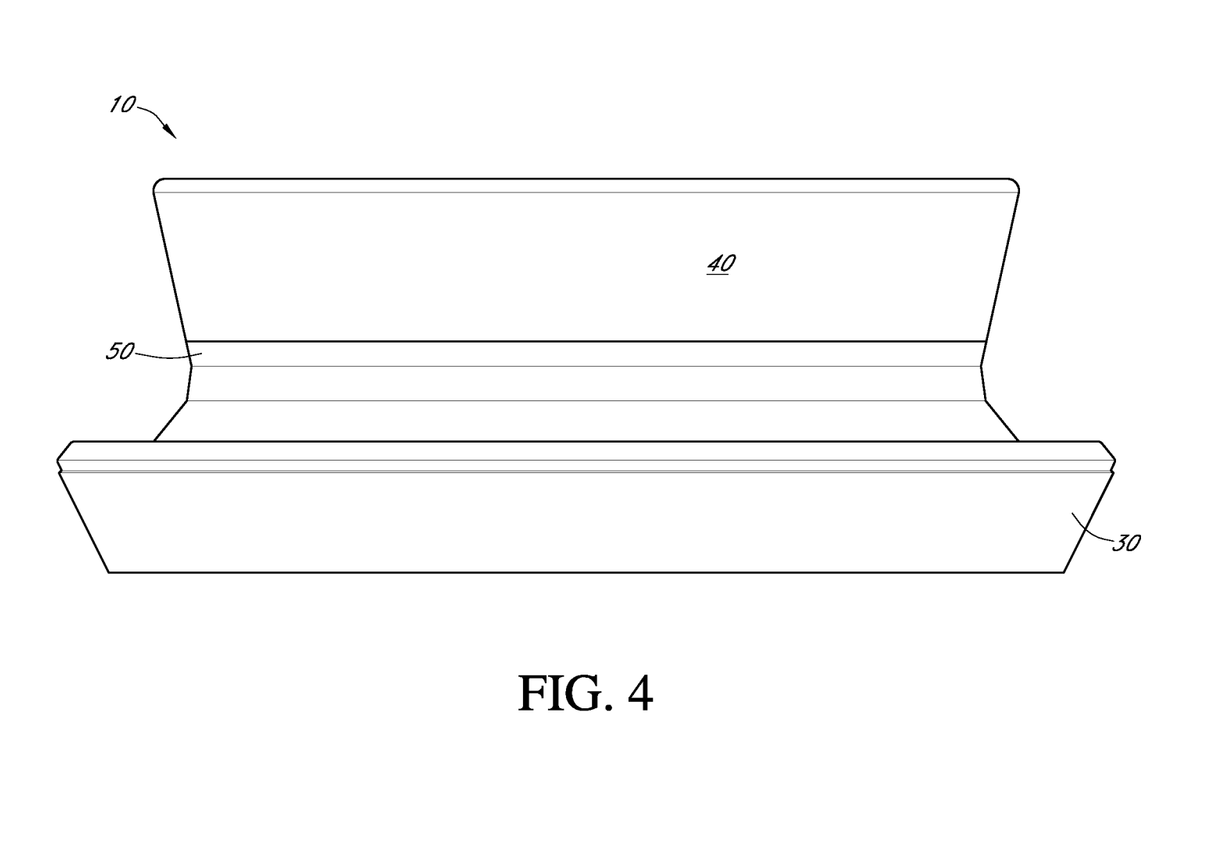
FIG. 4 provides a front view of an illustrative embodiment feeder with a coating on a portion thereof.
Figure 5:
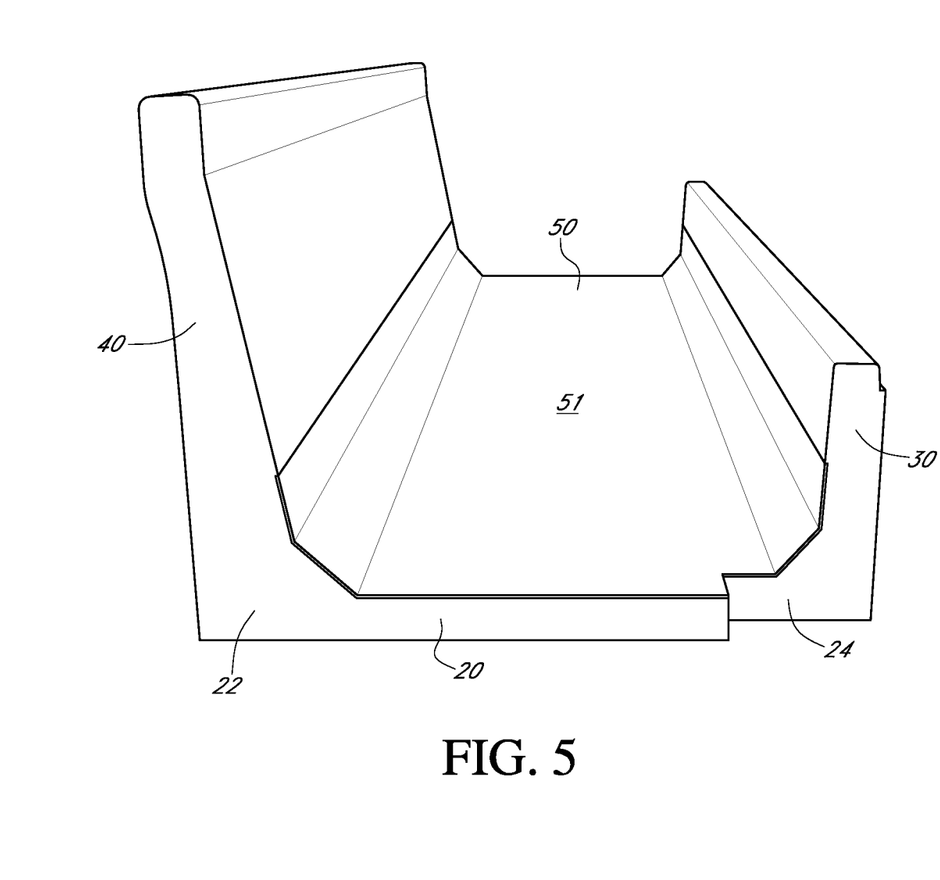
FIG. 5 provides a side view of the embodiment of a feeder shown in FIG. 4.

An illustrative embodiment of a coated feeder 10 is shown in FIGS. 4 & 5. The coated feeder 10 may be formed with a coating 50 on a portion of the interior surface thereof. In the illustrative embodiment shown in FIGS. 4 & 5, the coating 50 may extend along the entire width of the coated feeder 10. The coating 50 may cover the entire interior surface of the base 20, base/ridge interface 22, and/or base/back interface 24 (as best shown in FIG. 5). The coating 50 may also extend upward on a portion of the ridge 30 and/or back 40 (also shown in FIG. 5).

Figure 6:
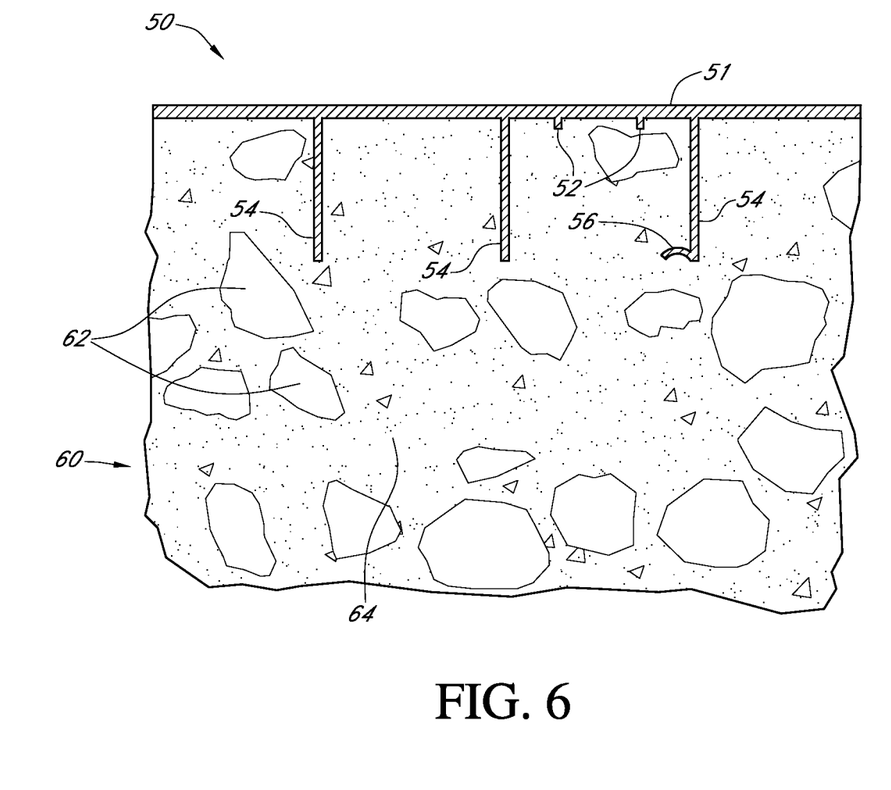
FIG. 6 provides a cross-sectional view of on embodiment of a coating that may be used with various embodiments of feeder.

A cross-sectional view of an illustrative embodiment the coated feeder 10 adjacent a portion of the coating 50 is shown in FIG. 6. An exterior surface 51 may provide the interface on which the feed or consumable is positioned during use. It is contemplated that the coating 50 may be configured such that the exterior surface 51 is of a texture that is pleasant to the tongue, lips, and/or other mouth parts of the animal for which the coated feeder 10 is used. For example, if the coated feeder 10 is used for cattle, it is contemplated that the coating 10 may be formed of a smooth vinyl material, in which case it is expected that cattle would leave very little feed or consumable in the coated feeder 10. This could lead to less wasted feed and faster weight gain for cattle fed with the coated feeder 10 compared to those fed with a feeder 12.

The coating 50 may include at least one tab 52 and linear protrusion 54 opposite the exterior surface 51 that extend into a structural component of the coated feeder 10. In the illustrative embodiment of the coated feeder 10, the structural components may be made of concrete 60 having a typical aggregate 62 and cement mixture. At least one linear protrusion 54 may be formed with a hook 56 on the distal end thereof. Additionally, the coating 50 may include one or more channels 58 at one or more edge thereof, which is shown for the embodiment of a coating 50 pictured in FIGS. 7A & 7B. The number, configuration and/or relative dimensions of the tab 52, linear protrusion 54, hook 56, and/or channel 58 in no way limits the scope of the coated feeder 10 as disclosed herein. The linear protrusion 54, tab 52, hook 56, and/or channel 58 may serve to adequately secure the coating 50 to the concrete 60. The coating 50 in the illustrative embodiment of the coated feeder 10 may be that as disclosed in U.S. patent application Ser. No. 13/625,094, which application is incorporated by reference herein in its entirety.

One method of making the illustrative embodiment of the coated feeder 10 as disclosed herein involves first forming the coating 50 into roughly the required shape for the final product and/or the mold 14 used in the fabrication process. This may be accomplished by first placing a relatively flat sheet of coating 50 onto a mold 14, and then using heat to bend the coating 50 at the appropriate places by the appropriate amount. Alternatively, the coating 50 may be pre-formed with the required bends to properly engage a mold 14 having a predetermined shape and/or configuration. In the illustrative embodiment, this may require making at least two bends—one to accommodate the base/ridge interface 22 and another to accommodate the base/back interface 24. More specifically, the illustrative embodiment pictured herein may require four bends—two of approximately 45 degrees each to accommodate the base/ridge interface 22 and two others (of approximately 55 degrees each) to accommodate the base/back interface 24.

Figure 7A:
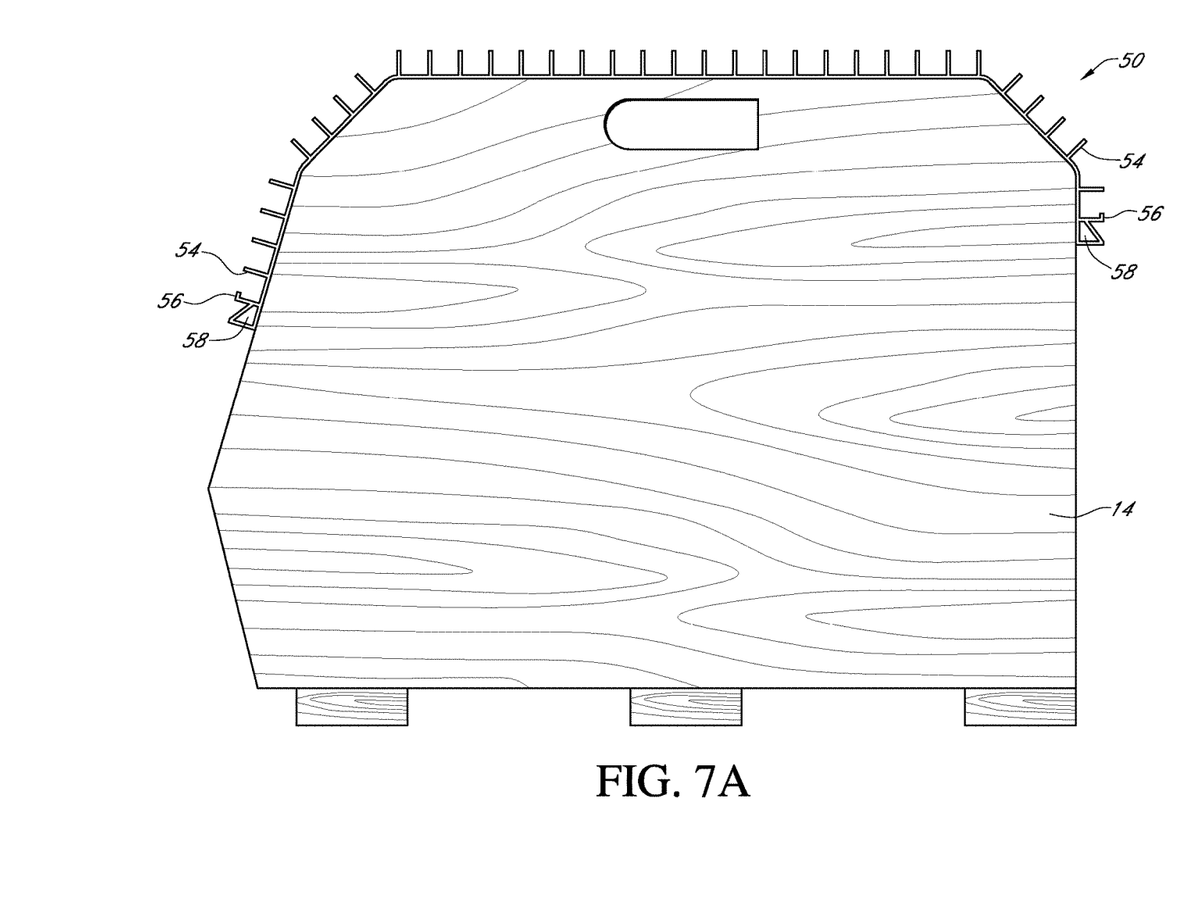
FIG. 7A provides a perspective view of an illustrative embodiment of a coating positioned on a mold.

A perspective view of the illustrative embodiment of a coating 50 with appropriate bends necessary to follow the contour of an illustrative embodiment of a mold 14 is shown in FIG. 7A. This configuration may result in a first portion of the coating 50 (which first portion may be adjacent the ridge 30 in the finished coated feeder 10) to be angled with respect to a second portion of the coating 50 (which second portion may be adjacent the base 20 in the finished coated feeder 10) by approximately 90 degrees. This configuration also may result in a third portion of the coating 50 (which third portion may be adjacent the back 40 in the finished coated feeder 10) to be angled with respect to the second portion of the coating 50 by approximately 110 degrees. In one embodiment, the base 20 may be angled with respect to the back 40 by any amount between 45 degrees and 165 degrees, and the base 20 may be angled with respect to the ridge 30 by any amount between 45 degrees and 165 degrees. However, it is contemplated that the optimal angles of the various portions of the coated feeder 10 will vary from one embodiment thereof to the next, and therefore the angles thereof are in no way limiting to the scope of the present disclosure.

Figure 7B:
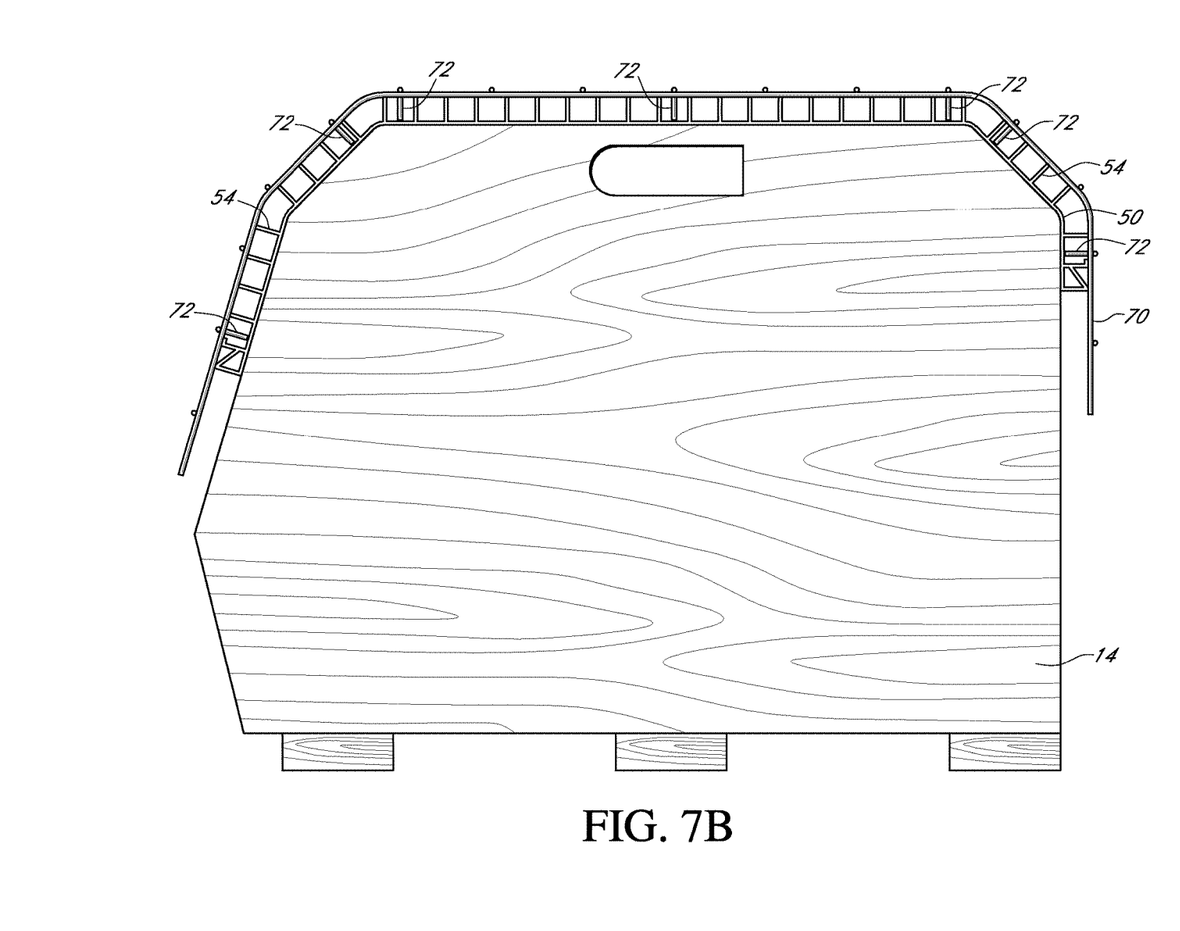
FIG. 7B provides a perspective view of the embodiment of a coating and a mold shown in FIG. 7A with an illustrative embodiment of a reinforcement structure engaged with the coating.

Next, a chemical adhesive may be applied to the edges of the coating 50. The chemical adhesive may mitigate against the coating 50 becoming dislodged from the concrete 60 and may also mitigate against water and/or other unwanted material from entering between the coating 50 and concrete 60. At this point, wire, rebar, and/or other reinforcement structure 70 may be placed on the coating 50 adjacent the surface from which tabs 52 may protrude (i.e., opposite the exterior surface 51) to ensure that the position of the coating 50 relative to the mold 14 is constant and to increase the structural soundness of the finished coated feeder 10. The reinforcement structure 70 may include one or more coating engagers 72 as shown in FIG. 7B to allow the weight of the reinforcement structure 70 to press the exterior surface 51 of the coating 50 against the mold 14. In one illustrative embodiment the reinforcement structure 70 may be configured as a wire grid and/or semi-grid of squares. The coating engagers 72 may be formed by cutting the wire at one node of the grid and bending that wire toward the coating 50, which may cause that coating engager 72 to be oriented approximately perpendicular to the coating 50 and/or the remainder of the reinforcement structure 72, which is shown in FIG. 7B.

One or more holes may be made in the coating 50 to accommodate pins (not shown) and to correspond with one or more holes in the mold 14, a second mold 14, and/or or additional mold pieces (not shown). The pins (not shown) may prevent any unwanted relative movement between the coating 50 and the mold 14 (and/or additional mold pieces) and/or between the concrete 60 and the coating 50 during the cure time for the concrete 60. In the illustrative embodiment of the coated feeder 10 it is contemplated that these holes may be positioned in a portion of the coating 50 adjacent the ridge 30, but the specific position, dimensions, and/or configuration thereof is in no way limiting to the scope of the present disclosure.

In one embodiment, the pins may be secured to an additional mold piece (or pieces, neither shown), and the additional mold piece may be configured to engage either side of the mold 14 to provides lateral limits to the concrete 60 when it is poured. The additional mold piece(s) may also be configured to provide a limit for the distal ends of both the ridge 20 and back 30, and may also be configured to provide a support for the coated feeder 10 (e.g., legs, base, etc.). It is contemplated that the specific and optimal configuration of the mold 14 and/or additional mold pieces will vary from one embodiment of the coated feeder 10 to the next, and therefor the configuration thereof in no way limits the scope of the present disclosure. In some embodiments, the coating 50 may be pre-formed with approximately the desired bends therein on a first mold 14 and then transferred to a second mold 14 for application of the reinforcement structure 70 and introduction of concrete 60. The second mold 14 may be configured as a typical concrete mold for making a feeder 12 having the desired features, such as a base 20, ridge 30, and back 40 with specific dimensions and spatial relationships with respect to one another.

After the coating 50 and reinforcement structure 70 have been properly positioned and/or secured in a mold 14 configured to accept concrete 60, concrete 60 may be positioned in the mold 14 (or the second mold 14, depending on the specific embodiment according to the present disclosure). After the concrete 60 has adequately cured, the coated feeder 10 may be removed from the mold 14 (or second mold 14) and the edges may be finished. If pins (not shown) are used, the resulting coated feeder 10 may include am aperture through the coating 50 and concrete 60 corresponding to the position of the pin(s).

In one illustrative embodiment of a coated feeder 10, the coated feeder 10 may be eight feet wide, the distance from the ground to the top of the back may be 35 inches, the distance from the ground to the top of the ridge 30 may be 24 inches, the distance from the ground to the base 20 may be 13 inches, and the distance from the ridge 30 to the back 40 may be 25.5 inches. However, the optimal dimensions of the base 20, ridge 30, back 40, coating 50, tab 52, linear protrusion 54, hook 56, and/or channel 58 will vary from one embodiment of the coated feeder 10 to the next, and are therefore in no way limiting to the scope thereof. It is contemplated that the configurations of the coating 50 may be determined by a number of factors affecting the propensity of the coating 50 and/or portions thereof to separate from the concrete 60. The various elements of the coated feeder 10 may be formed of any material that is suitable for the application for which the coated feeder 10 is used. Such materials include but are not limited to rubber, silicon, other polymers, metals, metallic alloys, cellulosic materials, concrete, cement, and/or combinations thereof.

Although the specific embodiments pictured and described herein pertain to a coated feeder 10 having a base 20, ridge 30, and back 40, the coated feeder 10 may be differently configured. For example, other embodiments of the coated feeder 10 may have side panels thereon. Accordingly, the scope of the coated feeder 10 is in no way limited by the specific structure of the concrete 60 to which the coating 50 is engaged to make the coated feeder 10.

It is contemplated that the coated feeder 10 as disclosed and claimed herein may provide a feeder from which various species of animals will consume a larger portion of feed and/or other consumables compared with feeders found in the prior art. Specifically, through testing Applicant has determined that cattle will leave less feed and/or consumables on the surface of the coated feeder 10 than on prior art feeders due to the superiority of the texture of the coated feeder 10. That is, given a set amount of feed and/or consumables, cattle will consume more feed and/or consumables from a coated feeder 10 than from other feeders because the cattle find the texture of the coating 50 less offensive to the cattle's mouth, cheeks, and/or tongue. As such, when consuming feed and/or consumables from a coated feeder 10, the cattle do not leave a layer of feed and/or consumables against the feeder due to the unpleasant texture of the feeder as cattle are prone to do with feeders found in the prior art. As a result, cattle may gain weight faster when fed using a coated feeder 10, and cattle growers using coated feeders 10 may use feed and/or consumables more efficiently with less waste thereof.

Having described the preferred embodiments, other features, advantages, and/or efficiencies of the coated feeder 10 will undoubtedly occur to those versed in the art, as will numerous modifications and alterations of the disclosed embodiments and methods, all of which may be achieved without departing from the spirit and scope of the coated feeder 10. It should be noted that the coated feeder 10 is not limited to the specific embodiments pictured and described herein, but are intended to apply to all similar apparatuses for decreasing the amount of feed wasted in agriculture. Modifications and alterations from the described embodiments will occur to those skilled in the art without departure from the spirit and scope of the coated feeder 10.

The invention claimed is:

1. A method of manufacturing a coated feeder comprising the steps of:
   a. engaging a coating with a mold, wherein said coating includes a smooth exterior surface, at least one linear protrusion on a surface opposite said smooth exterior surface, a tab extending from said surface of said coating that is opposite said exterior surface, a second linear protrusion with a hook on a distal end thereof, wherein said second linear protrusion extends from said surface of said coating that is opposite said exterior surface, and a channel extending from said surface of said coating that is opposite said exterior surface;
   b. forming a first bend in said coating along a first length thereof, wherein said first bend results in a first portion of said smooth exterior surface being angled at less than 180 degrees from a second portion of said smooth exterior surface;
   c. forming a second bend in said coating along said first length thereof, wherein said second bend results in a third portion of said smooth exterior surface being angled at less than 180 degrees from said first portion of said smooth exterior surface after the step of forming said first bend in said coating;
   d. forming a first bend in a reinforcement structure, wherein said reinforcement structure is defined as wire, and wherein said reinforcement structure engages said coating via at least one coating engager formed in said reinforcement structure;
   e. forming a second bend in a reinforcement structure after the step of forming said first bend in said reinforcement structure;
   f. positioning said reinforcement structure adjacent said coating prior to placing said first portion of concrete in said mold;
   g. allowing a weight of said reinforcement structure to secure said coating to said mold, wherein said first portion of concrete engages said reinforcement structure;
   h. placing a first portion of concrete in said mold;
   i. allowing said first portion of concrete to cure;
   j. removing said coating and said first portion of concrete simultaneously from said mold.

2. The method of manufacturing a coated feeder according to claim 1 wherein said method further comprises positioning an additional mold piece adjacent said mold prior to coating prior to placing said first portion of concrete in said mold, wherein said additional mold piece provides width, height, and length limits for said coated feeder and a base, ridge, and back thereof.

3. A method of manufacturing a coated feeder comprising the steps of:
   a. engaging a coating with a mold, wherein said coating comprises:
      i. a smooth exterior surface;

ii. at least one linear protrusion on a surface opposite said smooth exterior surface;
iii. a tab extending from said surface of said coating that is opposite said exterior surface;
iv. a second linear protrusion with a hook on a distal end thereof, wherein said second linear protrusion extends from said surface of said coating that is opposite said exterior surface; and,
v. a channel extending from said surface of said coating that is opposite said exterior surface;
b. forming a first bend in said coating along a first length thereof, wherein said first bend results in a first portion of said smooth exterior surface being angled at less than 180 degrees from a second portion of said smooth exterior surface;
c. forming a second bend in said coating along said first length thereof, wherein said second bend results in a third portion of said smooth exterior surface being angled at less than 180 degrees from said first portion of said smooth exterior surface after the step of forming said first bend in said coating;
d. forming a first bend in a reinforcement structure, wherein said reinforcement structure is defined as wire, and wherein said reinforcement structure engages said coating via at least one coating engager formed in said reinforcement structure;
e. forming a second bend in said reinforcement structure after the step of forming said first bend in said reinforcement structure;
f. positioning said reinforcement structure adjacent said coating;
g. allowing a weight of said reinforcement structure to secure said coating to said mold;
h. placing a first portion of concrete in said mold;
i. allowing said first portion of concrete to cure;
j. removing said coating and said first portion of concrete simultaneously from said mold.

4. The method of manufacturing a coated feeder according to claim 3 wherein said method further comprises positioning an additional mold piece adjacent said mold prior to coating prior to placing said first portion of concrete in said mold, wherein said additional mold piece provides width, height, and length limits for said coated feeder and a base, ridge, and back thereof.

* * * * *